United States Patent
Zalewski

(10) Patent No.: US 8,953,029 B2
(45) Date of Patent: Feb. 10, 2015

(54) PORTABLE DEVICE INTERACTION VIA MOTION SENSITIVE CONTROLLER

(75) Inventor: Gary M. Zalewski, Oakland, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 892 days.

(21) Appl. No.: 12/621,374

(22) Filed: Nov. 18, 2009

(65) Prior Publication Data

US 2011/0118032 A1 May 19, 2011

(51) Int. Cl.
H04N 7/12 (2006.01)
A63F 13/98 (2014.01)
A63F 13/40 (2014.01)

(52) U.S. Cl.
CPC .................. *A63F 13/02* (2013.01); *A63F 13/10* (2013.01); *A63F 2300/105* (2013.01); *A63F 2300/1093* (2013.01); *A63F 2300/204* (2013.01); *A63F 2300/302* (2013.01)
USPC .......................................................... 348/61

(58) Field of Classification Search
CPC ... A63F 13/02; A63F 13/10; A63F 2300/105; A63F 2300/1093; A63F 2300/204; A63F 2300/302; H04N 7/18
USPC .......................................................... 348/61
See application file for complete search history.

(56) References Cited

U.S. PATENT DOCUMENTS

| | | | | |
|---|---|---|---|---|
| 2002/0149613 | A1* | 10/2002 | Gutta et al. | 345/728 |
| 2002/0193150 | A1* | 12/2002 | Pritchard | 455/567 |
| 2006/0267927 | A1 | 11/2006 | Crenshaw et al. | 345/156 |
| 2007/0298882 | A1 | 12/2007 | Marks et al. | |
| 2008/0318689 | A1* | 12/2008 | Rofougaran et al. | 463/42 |
| 2009/0005165 | A1* | 1/2009 | Arezina et al. | 463/37 |

FOREIGN PATENT DOCUMENTS

| | | | | |
|---|---|---|---|---|
| JP | 10228347 | 8/1998 | | G06F 3/033 |
| JP | 2001-023790 | 1/2001 | | |
| JP | 2005160968 | 6/2005 | | A63F 13/08 |
| WO | 02/071315 | 9/2002 | | |
| WO | 2008/015463 | 2/2008 | | |

* cited by examiner

*Primary Examiner* — Anner Holder
(74) *Attorney, Agent, or Firm* — Martine Penilla Group, LLP

(57) ABSTRACT

Methods, systems, and computer programs for wireless interaction with a portable device supported by a stand are presented. In one method operation, a communications link is established between the portable device and the stand. The stand tracks the motion of an input device within an interactivity zone. In another method operation, the portable device interfaces with the input device to generate actions associated with game objects in the portable device, where the interface takes place when the input device is in or near the interactivity zone. Additionally, the stand moves when the tracking detects that the input device is outside predefined boundaries near an edge of the interactivity zone. The stand movement information is transferred via the communications link to update the location of the interactivity zone.

20 Claims, 15 Drawing Sheets

PORTABLE DEVICE INTERACTION VIA MOTION SENSITIVE CONTROLLER

CROSS REFERENCE TO RELATED APPLICATIONS

This application is related to U.S. patent application Ser. No. 12/463,360, filed May 8, 2009, and entitled "BASE STATION MOVEMENT DETECTION AND COMPENSATION"; and U.S. application Ser. No. 12/503,846, filed on Jul. 16, 2009, and entitled "DISPLAY VIEWING SYSTEM AND METHODS FOR OPTIMIZING DISPLAY VIEW BASED ON ACTIVE TRACKING", which are incorporated herein by reference.

BACKGROUND

1. Field of the Invention

The present invention relates to methods, systems, and programs for wireless interaction with a portable device, and more particularly to methods, systems, and programs for interaction between a portable device and a controller defined to interact with a game console.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms include the Sony Playstation, Sony Playstation2 (PS2), or Sony Playstation 3 (PS3), each of which is sold in the form of a game console. The game console is designed with specialized processing hardware, including a Central Processing Unit (CPU), a graphics synthesizer for processing intensive graphics operations, a vector unit for performing geometry transformations, and other glue hardware, firmware, and software.

Mobile gaming platforms are designed for playing games without the need to be attached to a display or a power source. Examples mobile gaming platforms include Sony PlayStation Portable (PSP) and PSP Go. Additionally, other devices whose main function is other than playing games can also provide mobile gaming functionality, such as cell phones, Personal Digital Assistants (PDA), MP3 players, etc. Online gaming is also possible, wherein a user can interactively play against or with other users over the Internet.

As game complexity continues to intrigue players, gaming software and hardware manufacturers have continued to innovate to enable additional interactivity. In reality, however, the way in which users interact with a game has not changed dramatically over the years. Commonly, users still play computer games using hand held controllers or interact with programs using mouse pointing devices. Portable gaming devices that have gyro and position sensing capabilities are often twisted and turned during game play to accommodate a user interface for the game. However, it is uncomfortable for the user to visually track the screen unless the user moves his head in the same direction as the twisting and turning of the gaming device. This is not often possible, resulting in poor gaming experiences.

As game complexity continues to intrigue players, game and hardware manufacturers have continued to innovate to enable additional interactivity and computer programs. A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

It is in this context that embodiments of the invention arise.

SUMMARY

Embodiments of the present invention provide methods, systems, and computer programs for methods, systems, and programs for wireless interaction with a portable device. In one embodiment, a method operation establishes a communications link between the portable device and the stand. The stand tracks the motion of an input device within an interactivity zone. In another method operation, the portable device interfaces with the input device to generate actions associated with game objects in the portable device, where the interface takes place when the input device is in or near the interactivity zone. Additionally, the stand moves when the tracking detects that the input device is outside predefined boundaries near an edge of the interactivity zone. The stand movement information is transferred via the communications link to update the location of the interactivity zone.

In another embodiment, a stand is defined for wireless interaction between a portable device and an input device, where the stand is defined for holding the portable device. The stand includes a camera, an input device detection module, a stand motion module, and a communications module. The camera captures image data, and the input device detection module tracks the location and movement of the portable device based on the image data. The input device detection module is defined to determine an interactivity zone where motion of the input device is tracked. Further, the stand motion module moves the stand when the input device is outside predefined boundaries near an edge of the interactivity zone. The communications module transfers stand movement information to the portable device.

In yet another embodiment, a computer program embedded in a computer-readable storage medium, when executed by one or more processors, is defined for wireless interaction with a portable device supported by a stand. The computer program includes program instructions for establishing a communications link between the portable device and the stand, and program instructions for tracking, by the stand, motion of an input device within an interactivity zone. In addition, the computer program includes program instructions for interfacing the portable device with the input device to generate actions associated with game objects in the portable device. The interfacing between the devices takes place when the input device is in or near the interactivity zone. The computer program also includes program instructions for moving the stand when the tracking detects that the input device is outside predefined boundaries near an edge of the interactivity zone, and program instructions for communicating stand movement information via the communications link to update the location of the interactivity zone.

It should be appreciated that the present invention can be implemented in numerous ways, such as a process, an apparatus, a system, a device or a method on a computer readable medium. Several inventive embodiments of the present invention are described below.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1A:
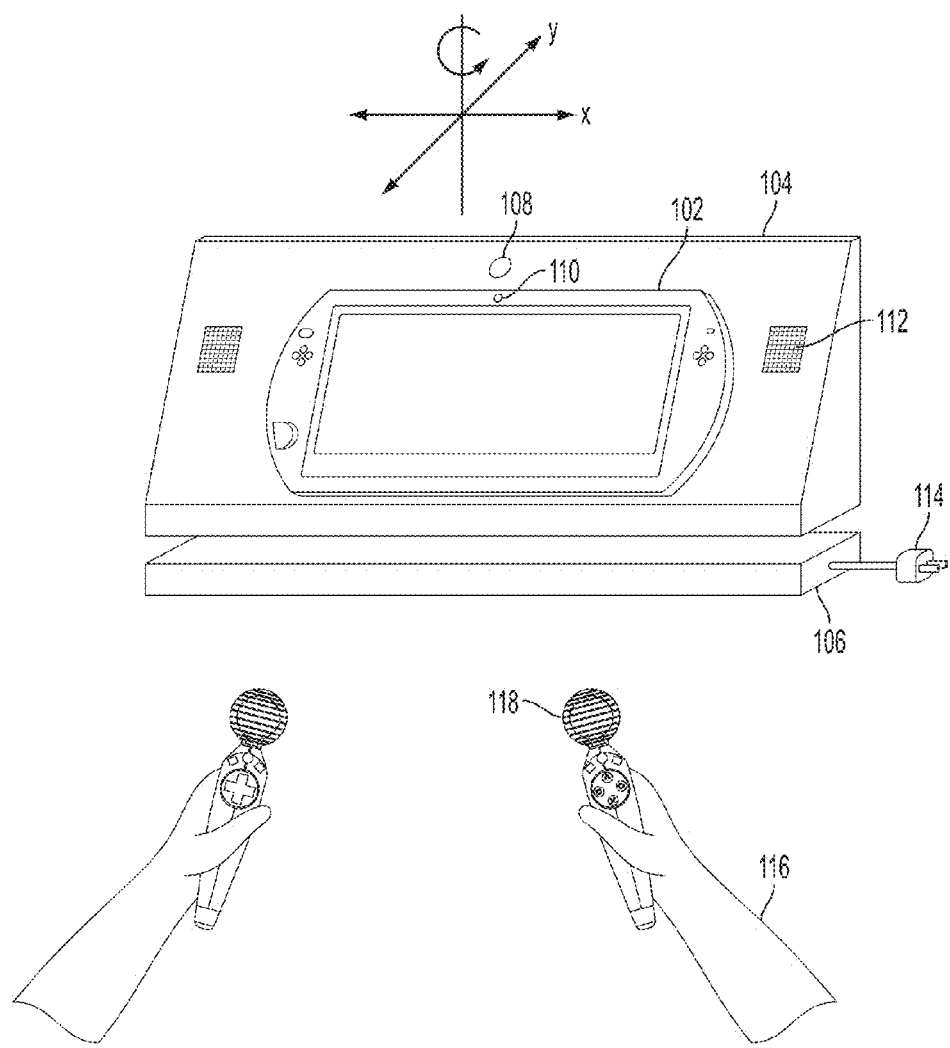
FIG. 1A is a simplified schematic diagram of a computer system for implementing embodiments of the present invention.

The following embodiments describe methods, apparatus, and computer programs for interaction between a portable device and an input device, such as a controller, defined to interact with a game console.

It will be obvious, however, to one skilled in the art, that the present invention may be practiced without some or all of these specific details. In other instances, well known process operations have not been described in detail in order not to unnecessarily obscure the present invention.

FIG. 1 is a simplified schematic diagram of a computer system for implementing embodiments of the present invention. Portable device 102 is firmly attached to stand 104 so portable device 102 does not become detached when the stand moves. In one embodiment, portable device 102 has an electrical communication with stand 104 to enable the exchange of information and power. In another embodiment, any interaction between stand 104 and portable device 102 is performed using wireless communications, such as WiFi, BlueTooth, infrared (IR), etc.

It should be noted that many of the operations performed by the portable device or the stand will be described in reference to either the portable device or the stand, but other embodiments may have the same operations performed by the other entity, or by both the portable device and the stand. For example, a play zone, also referred to herein as an interactivity zone, may be established by the portable device and communicated to the stand, or established by the stand and communicated to the portable device, or the play zone may be established independently by the stand and the portable device. It should be appreciated that the embodiments described below are exemplary in the way operations are performed. Other embodiments may have different devices performed the described operations. The embodiments described herein should therefore not be interpreted to be exclusive or limiting, but rather exemplary or illustrative.

Camera 110 in portable device 102 and camera 108 in stand 104 take images of the interactivity zone to enable the tracking of player 116 and wireless controller 118. In one embodiment, the camera on the portable device is adjustable and can pivot in different directions to obtain a better viewing angle of the interactivity zone. Interactivity zone is referred to herein as the area that the portable device tracks visually for interacting with an input device located in such area.

In another embodiment, the portable gaming device has the camera on the opposite side of the display. In this case, a reflector in the stand allows the portable device to have a view of the interactivity zone in front of the display. The tracking of the player may include determining the location of the player's face, hands, body, etc., in order to estimate the player's motion. One-hand wireless controller 118 is a controller designed to interface with a game console, such as the PS3. Embodiments of the invention allow a player to use the one-hand wireless controller designed for a different gaming device to interface with the portable device.

One-hand wireless controller 118 communicates wirelessly with portable device 110 to send or receive game information, such as pressing buttons, inertial controller information, tactile feedback, etc. In one embodiment, the round shape at one end of the controller facilitates the visual recognition of the controller to track the controller's motion. It should be appreciated that the embodiments of the invention are described in reference to a single-hand controller, but other types of controllers can also be used, such as a two-hand controller, a keyboard, a mouse, etc. In one embodiment, the inputs are originated by player's movements, without the need for a separate physical input device. The embodiments illustrated in FIG. 1A should therefore not be interpreted to be exclusive or limiting, but rather exemplary or illustrative.

In another embodiment the wireless controller communicates with the stand to request stand operations, or to create an action in the controller, such as illuminating an Light-Emitting Diode (LED) to indicate that the device is outside the play area being tracked. Speakers 112 in stand 104 provide audio output during play. The audio in the speakers can be generated by the portable device or by the stand to give player feedback, such as when calibrating the player's range of motion.

The embodiment shown in FIG. 1A includes a camera in the portable device and a camera in the stand, but other configurations are also possible. For example, in one configuration stand 104 does not include a camera and the tracking of the input device is performed by the portable device exclusively. In this case, the portable device commands the stand to move when needed. In other configurations the camera locations vary. For example, the camera on the portable device can be on the left side while the camera on the portable device can be on the right. The further apart the cameras are located, the easier it will be to use stereo-camera processing for improving the tracking of player or input device. In yet another embodiment, the stand or portable device can include more than one camera, including the possibility of a depth camera for measuring the distance of objects to the gaming device.

As the player moves, the view of the display by the player may degrade to the point where it may be difficult to play the game. The player may be watching the display from an angle and loose image resolution and valuable game information. To solve this problem, one embodiment of the invention moves the stand to place the display facing the player straight ahead. The move of the stand also improves the ability to track the input device or the player when the player is in the center of the camera's field of vision.

Base 106 sits on a substantially horizontal surface and is connected to stand 104. In one embodiment, base 106 is static and stand 104 moves in relation to the base. The embodiment of FIG. 1A allows stand 104 to move in the x and y directions, as well as in a yaw motion to turn the stand towards player 116. Other embodiments can have a base that moves or a stand 104 that has more or less degrees of movement, such as pitching, rolling, or any combination thereof. The pitching motion enables the display to better face the user and the rolling motion adjusts the base stands when the surface the base is standing on is not horizontal. Placing the display as square as possible to the player's viewing angle is important because of the small size of the display.

Power connector 114 allows the stand or base to connect to a power supply, although stand 104 can also operate on batteries. In one embodiment, portable device 102 has an electrical connector to stand 104 allowing the portable device to be charged or use the power source from the stand. Additionally, portable device 110 or stand 104 may include wired or wireless capabilities to connect to a network in order to enable multiplayer gaming.

Figure 1B:
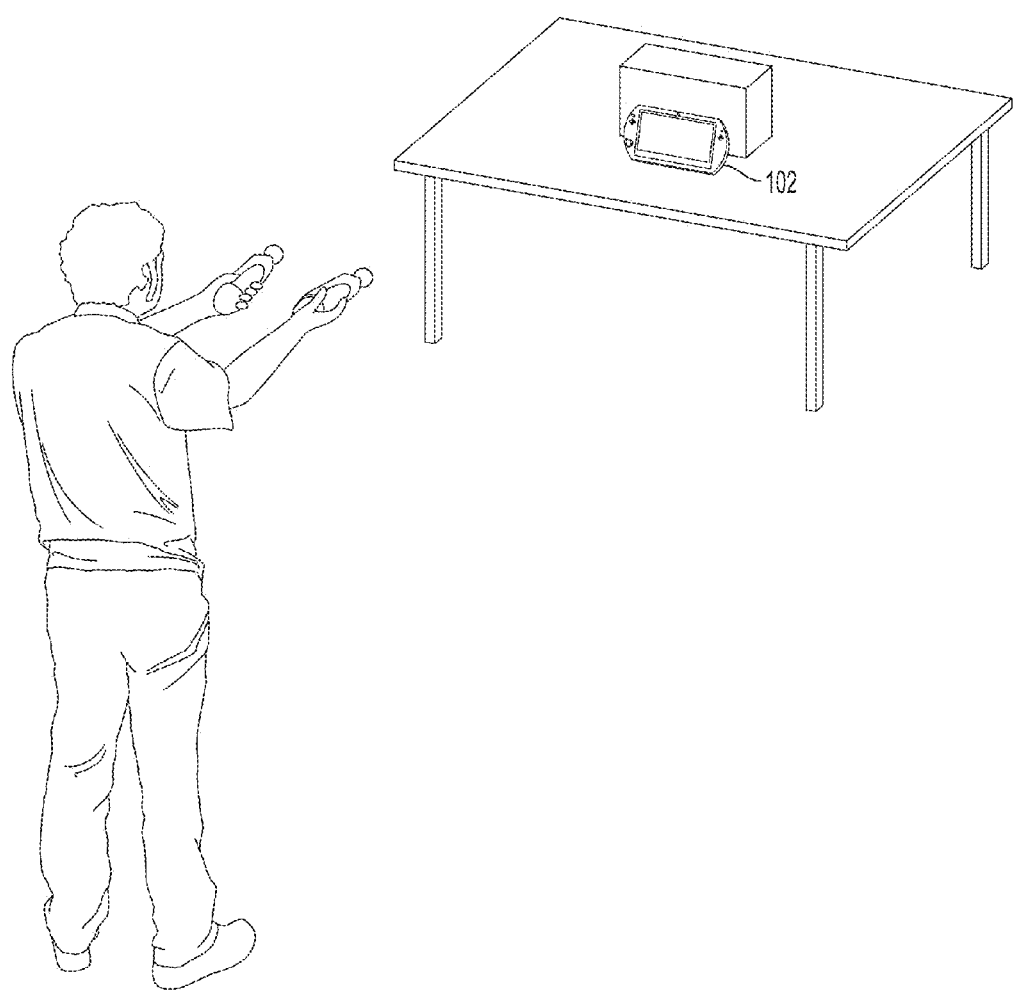
FIG. 1B illustrates a playing environment for interfacing a wireless controller with a mobile gaming device, according to one embodiment.

FIG. 1B illustrates a playing environment for interfacing a wireless controller with a mobile gaming device, according to one embodiment. A stand is not needed to interface the portable device with the wireless controller. The portable device is static during play and can be leaning against a vertical surface or include some form of standing mechanism attached to the back so the portable device can stand on a position close to vertical. In this case, the possibilities for adjusting are more limited because there is no movement by the device. One option is to adjust the viewing angle of the camera to focus image recognition on the area where the player is located.

Figure 2:
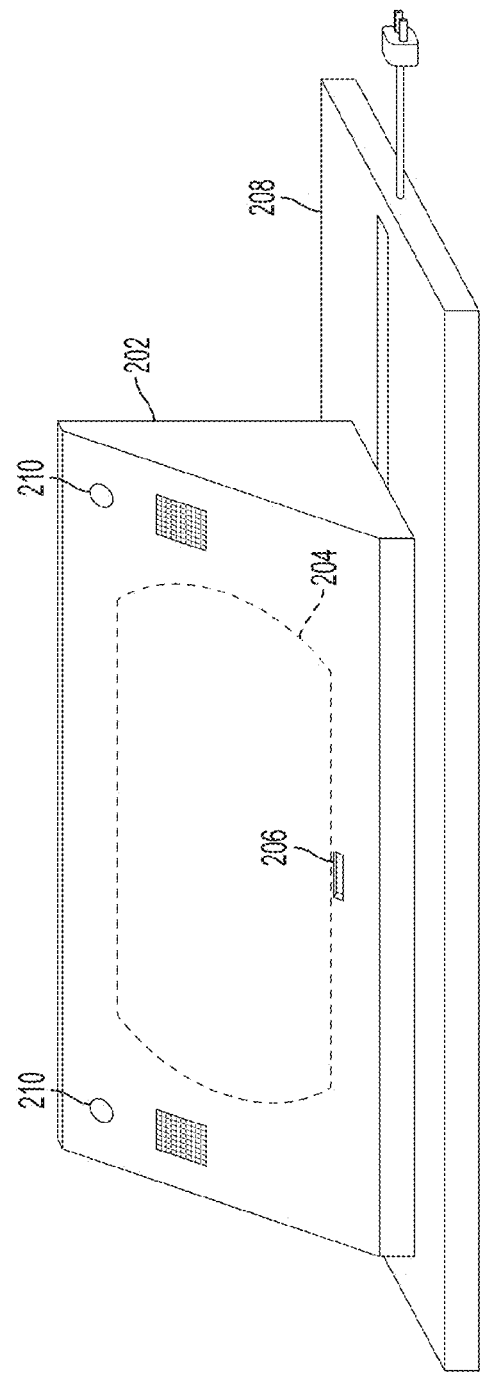
FIG. 2 shows an embodiment of a stand for holding a portable device.

FIG. 2 shows an embodiment of a stand for holding a portable device. Stand 202 includes stereo cameras 210, one on each side of the stand. A connector 206 designed to couple with a connector in the portable device allows communications between the portable device and the stand, as well as the transfer of power. Region 204 indicates the area where the portable device is located while coupled to the stand. However, area 204 may change depending on the device as the stand is defined to interact with multiple types of portable devices. Base 208 sits on a flat surface and stand 202 moves laterally on top of stand 208. Another mechanism on stand 202 allows the stand to move forward or backwards in respect to base 208.

Figure 3A:
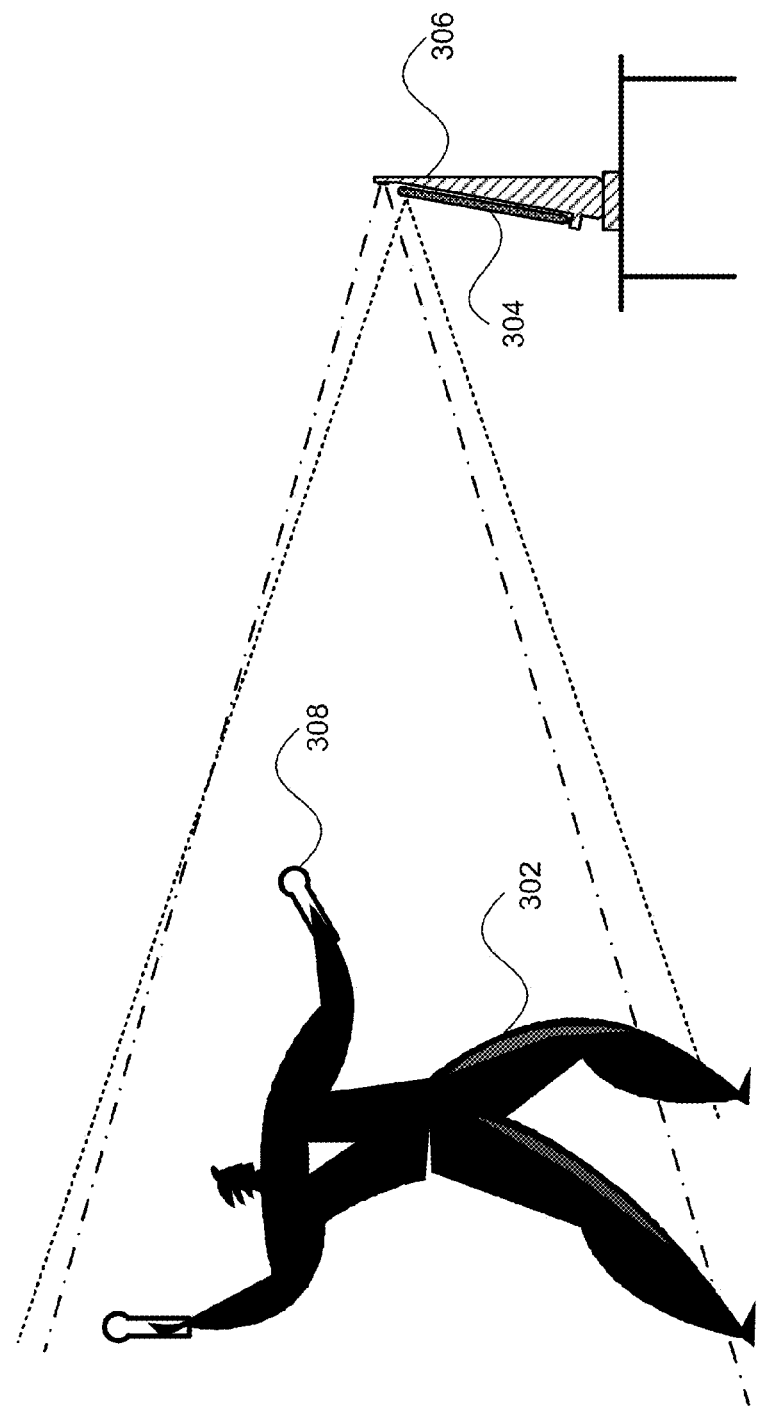
FIGS. 3A-3B illustrate the determination of an interactivity zone, according to one embodiment.
Figure 3B:
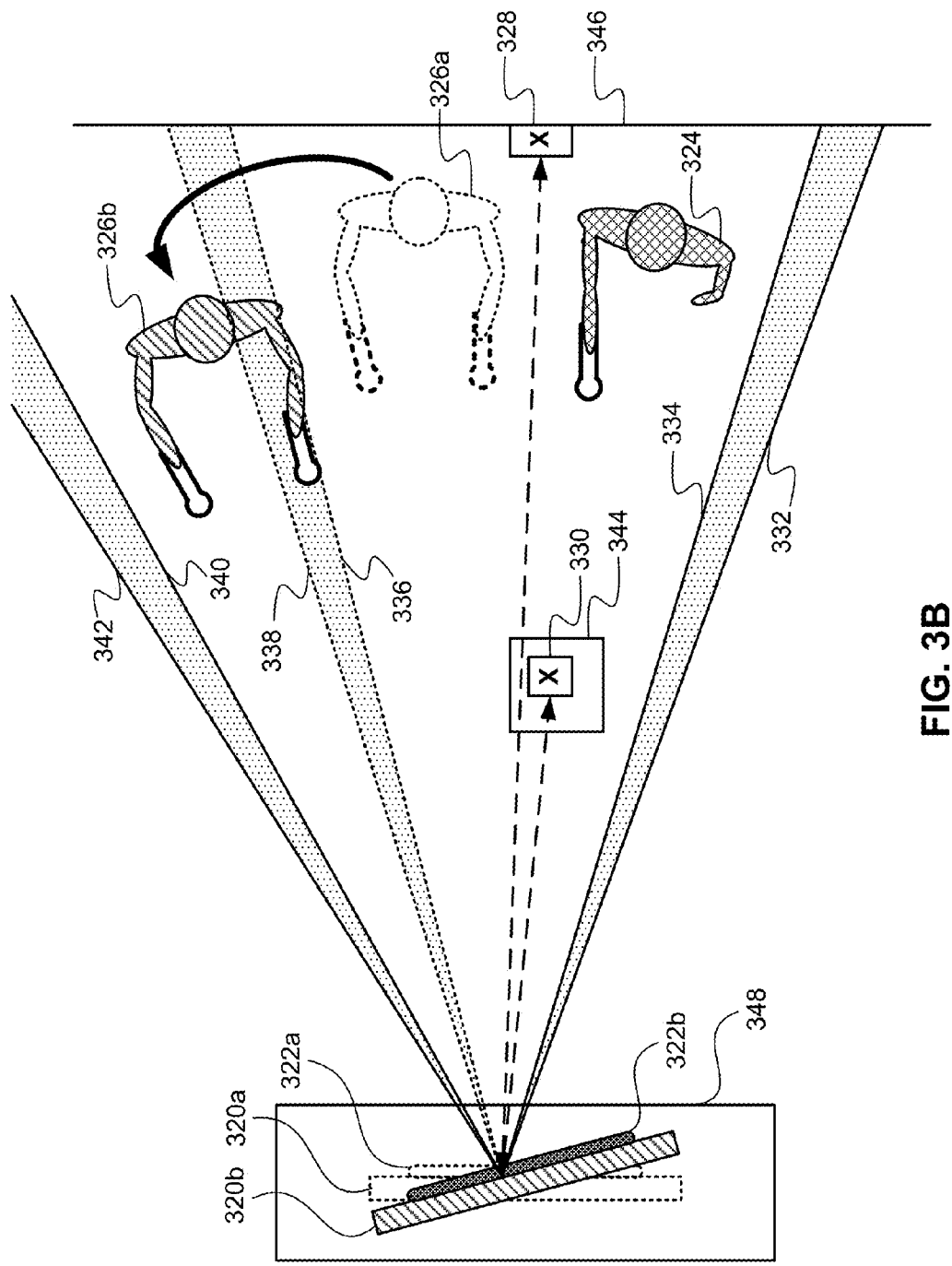

FIGS. 3A-3B illustrate the determination of an interactivity zone, according to one embodiment. FIG. 3A shows player 302 facing portable device 304 and stand 306. Both portable device 304 and stand 306 include a camera for visually tracking location and movement of controllers 308. Portable device 304 includes inertial and gyroscopic sensors to detect when the stand moves. When portable device 304 detects motion of the portable device itself, portable device 304 compensates the readings of the controller's motion to allow smooth controller tracking.

In another embodiment, the portable device is in communication with stand 306 to receive information regarding the movement of the stand. The motion information received from the stand is combined with the motion information obtained with the inertial and gyroscopic sensors to better estimate the actual motion of the portable device. For example, the actual motion of the stand may not be accurate or the stand may move accidentally, such as for example when the table is kicked by the player or when the player jumps causing the stand to move. Additionally, portable device 304 may track the background of the image captured by the camera in order to sense when the device or the stand moves. More details are described below in reference to FIG. 3B.

FIG. 3B shows a top view of a multiplayer environment. Initially the portable device resting on table 348 is in position 322a, and the stand is in position 320a. A first interactivity zone has been determined between planes 332 and 338. Both players 324 and 326a are located inside the first interactivity zone. In one embodiment, boundaries 334 and 336 are defined near the edges of the interactivity zone, such that the interactivity zone remains unchanged as long as all players stay within boundaries 324 and 326. Once a player is detected outside the boundaries, a new interactivity zone is established. Optionally, feedback may be given to the user moving outside the play area to indicate that the player is moving away from the central area in order to encourage the player not to drift too far away from the center. Otherwise, players may be too far apart and will be seeing the display on the portable device at an angle, resulting in degradation of the display view. Additionally, the player may move too far out of the playing zone, such that two players cannot be tracked at the same time. In this case, an error signal (such as tactile feedback) is generated and the player moving outside the interactivity zone may temporarily lose the ability to interface with the portable device.

In the example shown in FIG. 3B, player 326a has moved to position 326b, which is outside the first interactivity zone. Player 324a is still inside the interactivity zone. The stand detects that the controllers of the player are outside the first interactivity zone and a second interactivity zone is determined between planes 332 and 342, with boundaries at planes 334 and 340. To obtain a better viewing angle, the stand moves from position 320a to position 320b to center the viewing angle of the camera within the interactivity zone. In some cases, the stand will start moving before the determination of the interactivity zone area is final because the player may be out of view. In the reverse process, the interactivity zone will be reestablished once a space is observed between the players and the boundaries for a period of time in order to reduce the interactivity zone and improve the tracking of the input devices.

In another embodiment, the interactivity zone is determined at certain intervals, independent of whether the players are. This creates more motion by the stand in order to center the display with respect to the players. Depending on the game and the amount of tracking, the interval between recomputations of the interactivity zone can vary from a fraction of a second to 30 seconds, or more.

In another embodiment, the portable device identifies visual marks in the field of play, such as mark 328 in wall 346 behind the players, and mark 330 on table 344 located in front of the players. If the portable device detects a sudden unexpected move of one or more marks, the player device will compensate tracking on the controllers to compensate for the move of the portable device or the stand. If it is detected that one of the marks moves but the others do not, no compensation of tracking takes place since it will be assumed that the marker moved, but not the base station.

The portable device interfaces with the input devices to generate corresponding actions associated with game objects in the portable device, as long as the input devices are in the interactivity zone. Further, a communications link is established between the portable device and the stand. This communications link is used to transfer stand movement information when the stand moves. The portable device uses this movement information to update the location of the interactivity zone in the space in front of the portable device, and to maintain a spatial reference for the portable device. For example, if the stand moves 5° to the left, the portable device will use this information to expect players and the background to shift by 5°. This way, the interface between the portable device and the input devices is not affected by the movement of stand and portable device.

In another embodiment, the system detects when new controllers or players appear in the interactivity zone to join the existing game, or when some controllers or players stop playing the game. Thus, the system recalculates the interactivity zone once new controllers are detected, when some of the controllers disappear from the interactivity zone for a predetermined amount of time, or then some of the controllers become static for a long period to time.

Figure 4:
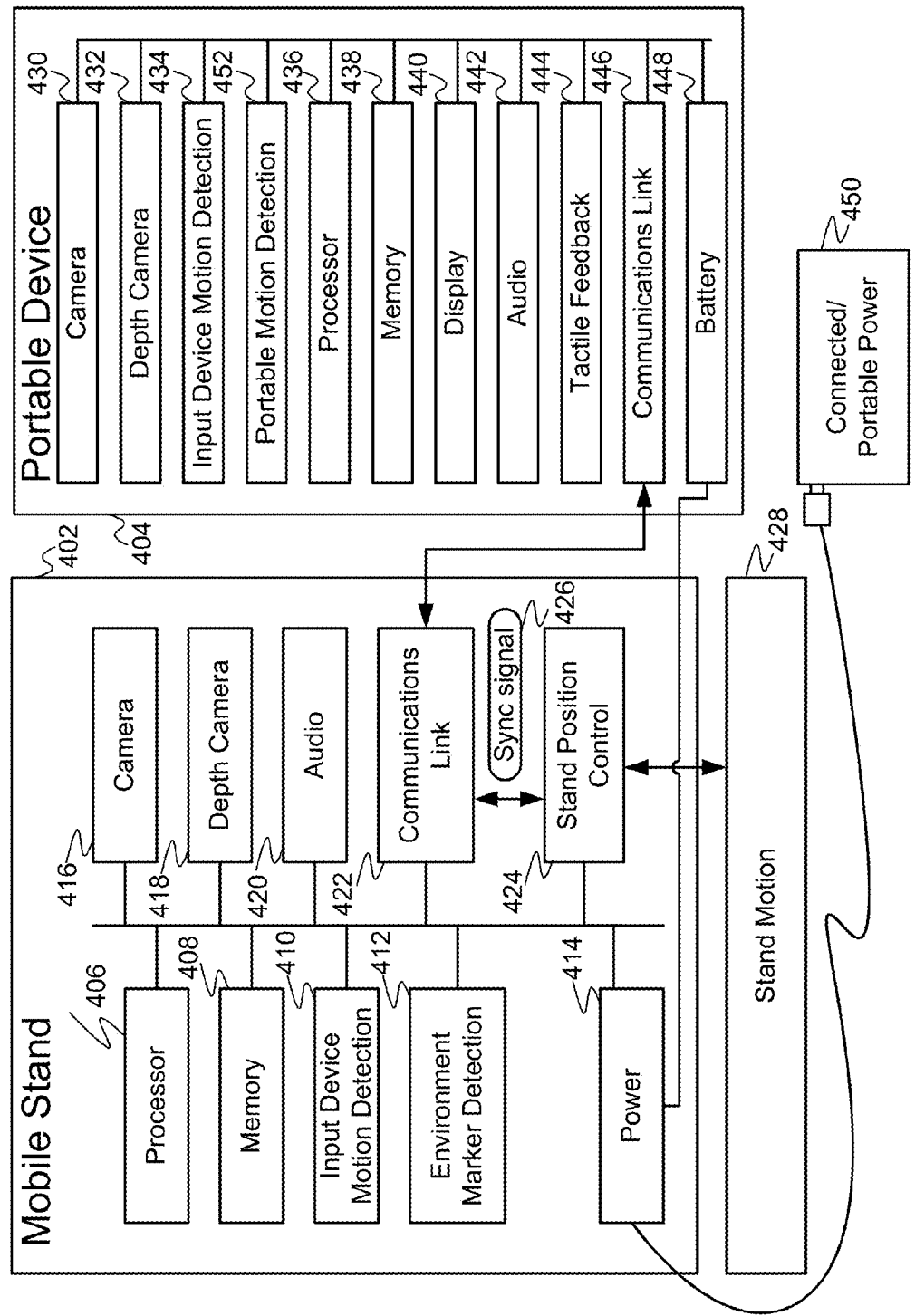
FIG. 4 illustrates the architecture of a mobile stand and a portable device in accordance with one embodiment of the invention.

FIG. 4 illustrates the architecture of mobile stand 402 and portable device 404 in accordance with one embodiment of the invention. Mobile stand 406 includes processor 406 and memory 408 for performing computer program operations. Input device motion detection 410 tracks the motion of the input device by scanning visual information provided by camera 416. In one embodiment, input device motion detection 410 also receives inertial and gyroscopic information about the input device to improve the tracking of the motion and the location of the input device.

Environment marker detection 412 scans visual data to identify static markers in the field of play. These static markers are used to detect movement of the portable device, such that a simultaneous change in location of the static markers means that the portable device has changed position. The movement of the portable device can be an accidental movement, such as a move of the table where the stand sits, or intentional, such as when the stand moves to better center the players in the viewing field.

Power supply 414 can connect to power or to a portable power supply 450. Power supply 414 can also operate with standard batteries or with rechargeable batteries for autonomous operation. A depth camera 418 provides information regarding the distance from the input device to objects in the interactivity zone. This information is combined with regular visual data to improve motion tracking. Gearing can be applied to the depth information to affect how motion of the input device is translated into corresponding actions in the game. Thus, the same movement by a player is translated to the same action in the game, independently of how near or far from the camera the player is.

Audio module 420 is connected to speakers for generating audio signals and also to a microphone for capturing sound in the playing area. In one embodiment, voice commands are processed by mobile stand 402. A communications link is used to exchange information with the portable device or with the controller. Stand position control 424 manages the motions of the stand. See for example the stand motions described above in reference to FIG. 3B. A motion synchronization signal 426 is exchanged between stand position control 424 and the portable device via communications link 422 in order to provide information to the portable device regarding motions of the stand. Stand motion 428 performs the actual physical motions of the stand as commanded by stand position control module 424.

Portable gaming device 404 also includes camera 430, depth camera 432, input device motion detection 434, portable motion detection 452, processor 436, memory 438, and audio 442 with similar functionality to the one described above for mobile stand 402. Portable device motion detection can be accomplished by a variety of methods and devices incorporated in the portable device, such as accelerometers, magnetometers, gyroscopes, etc. Display 440 presents visual output to the player. Tactile feedback 444 provides tactile information to the player, such as vibrating the portable device, or sends commands to the controller for giving controller tactile feedback to the player holding the controller.

Communications link 446 is used to exchange information with stand 402 or game controllers. Multiple protocols may be supported, such as WiFi, BlueTooth, infrared, etc. Battery 448 provides power to the portable device components and can be charged by the stand when the portable device is connected to the mobile stand.

It should be appreciated that the embodiment illustrated in FIG. 4 is an exemplary device architecture. Other embodiments may utilize different modules, or may arrange the same functionality across different modules. The modules in FIG. 4 can be instantiated in software, hardware, or a combination of hardware and software. When implemented in hardware, the modules may be implemented in a processor, an integrated circuit (IC), a field-programmable gate array (FPGA), a programmable logic device (PLD), flash memory, a digital signal processor (DSP), etc. The embodiment illustrated in FIG. 4 should therefore not be interpreted to be exclusive or limiting, but rather exemplary or illustrative.

Figure 5:
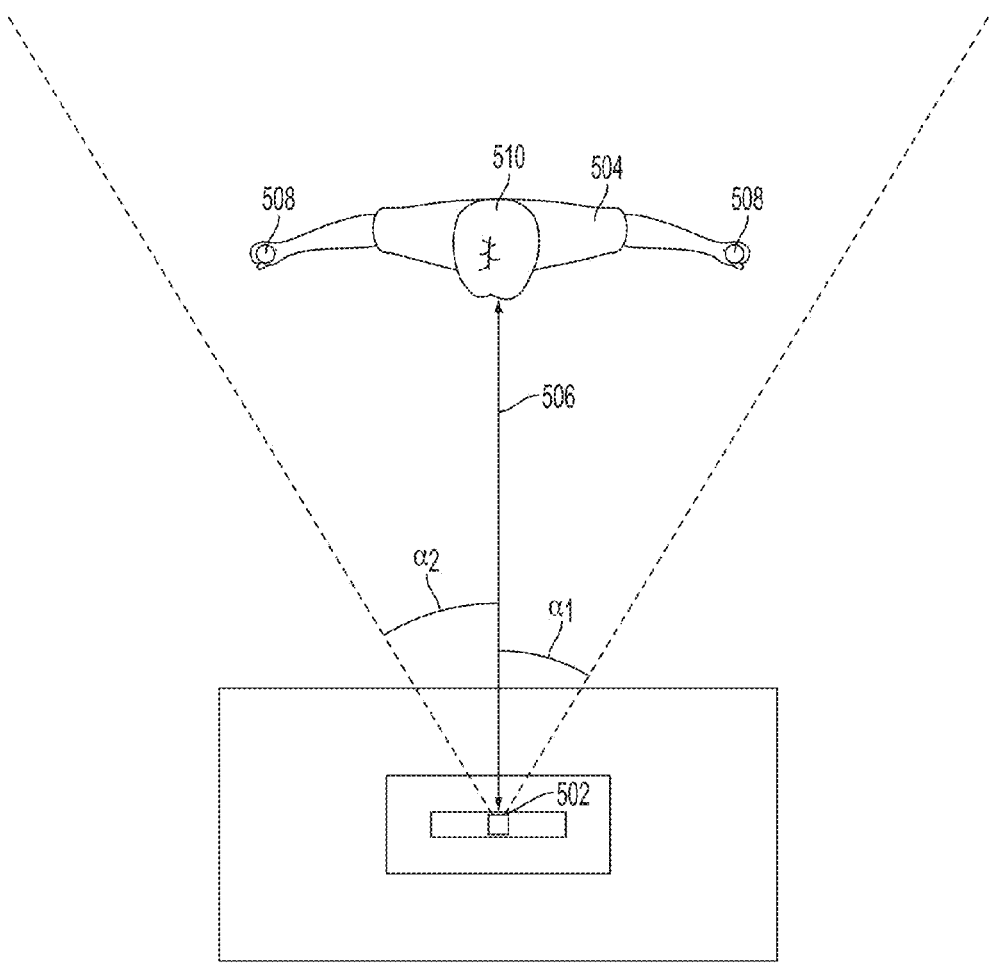
FIG. 5 depicts a system for calibrating the interactivity zone, according to one embodiment.

FIG. 5 depicts a system for calibrating the interactivity zone, according to one embodiment. During one form of calibration, the player extends both arms away from the body while holding one controller in each hand. In another embodiment, the calibration can be made in two operations: first a measurement is taken with the controller on one hand, and then with the controller in the other hand. Further, other players can also participate during calibration to determine the field of play, also referred to herein as the interactivity zone.

Once the position of controllers 508 is determined, the initial interactivity zone will be determined by giving a certain margin of movement on each side to accommodate for slight player moves. If a depth camera is available, the depth of field for the player is measured in order to better identify the location of the player within the field of play. In one embodiment, face recognition is used to determine the location of the player in relation to the controllers and the camera. Face recognition can be used to determine the distance from the camera to the player. The face recognition software identifies the side of the face and the distance between the eyes. The variation of these parameters over time is used as an indication of the player movement, as the side of the face and the distance between the eyes become smaller as the player moves away from the camera.

Additionally, the system may take other measures with the controllers in different positions, such as with the arm extended upward or extended downward. In another embodiment, the system estimates the possible reach of the player based on the distance between the controllers that define the arm span of the player, deducting the possible reach of the controllers upward or in other directions, even accounting for actions such as jumping, crouching, turning, etc.

The interactivity zone can have different shapes. In one embodiment, the interactivity zone is determined as a cone with a vertex at the camera and defined by the angle at the point of the cone. In another embodiment, the interactivity zone is determined by floor-perpendicular planes on the left and the right sides of the player. The planes have angles $\alpha_1$ and $\alpha_2$ with respect to a line perpendicular to the gaming device and extending towards the field of play. It should be appreciated that the embodiments illustrated in FIG. 5 are exemplary interactivity zones and calibration procedures. Other embodiments may utilize different interactivity zones or perform the calibration in different operations. The embodiments illustrated in FIG. 5 should therefore not be interpreted to be exclusive or limiting, but rather exemplary or illustrative.

Figure 6:
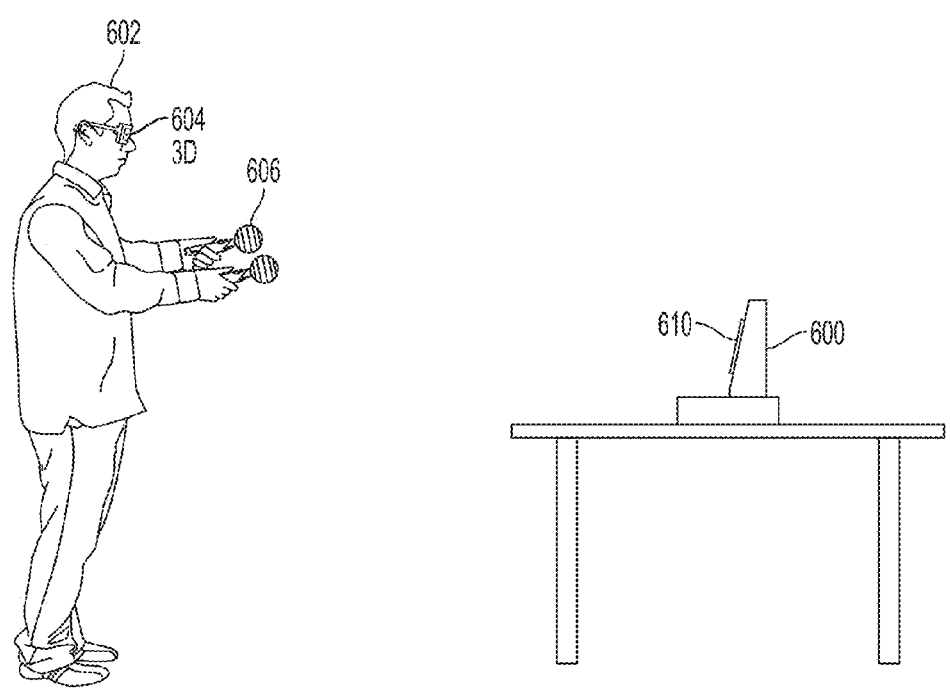
FIG. 6 depicts a player wearing 3D glasses interacting with a computing device, according to one embodiment.

FIG. 6 depicts player 602 wearing 3D glasses 604 interacting with computing device 610, according to one embodiment. In one embodiment, 3D glasses 604 can be used for delivery of a 3D experience to player 602. In another embodiment, 3D glasses 604 can be used to deliver a multiplayer game on a single display, such that each player wearing 3D glasses 604 perceive a different image on the display of portable device 610.

Figure 7A:
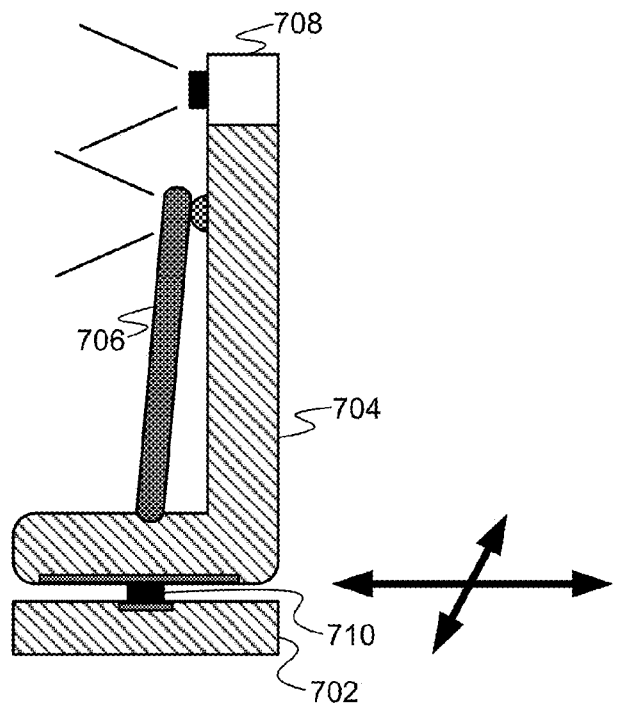
FIGS. 7A-7B illustrate different embodiments of stands for portable devices.
Figure 7B:
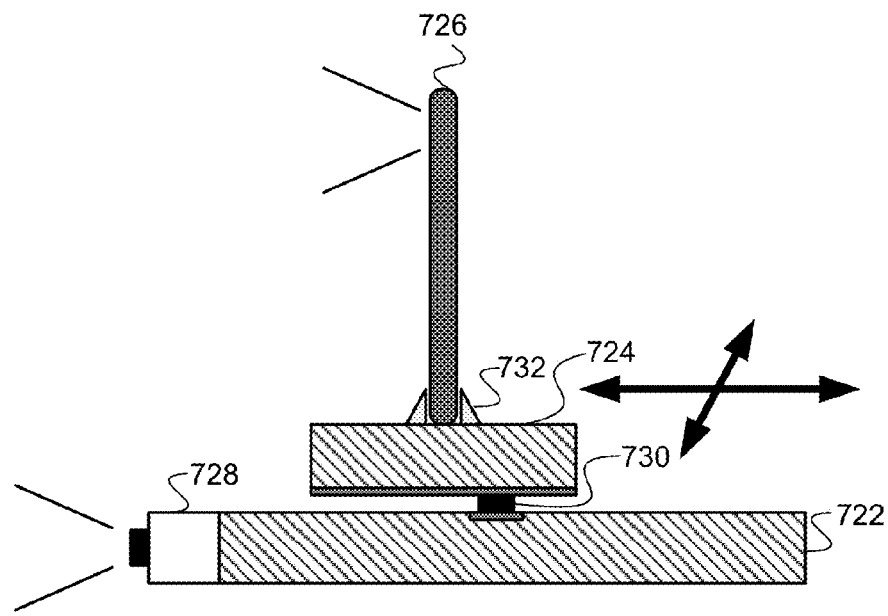

FIGS. 7A-7B illustrate different embodiments of stands for portable devices. FIG. 7A illustrates portable device resting at the bottom on an indentation at stand 704 and on the back on a resting surface at stand 704. Camera 708 is situated on top of stand 708. Base 702 holds stand 704 via connector 710. Stand 704 can move laterally as connector 710 slides along base 702. Additionally, stand 704 has a slot at the bottom where stand 704 joins connector 710 that allows stand 704 to move forwards and backwards.

FIG. 7B illustrates portable device 726 held in place by bracket 732 situated on top of stand 724. As in FIG. 7A, stand 724 is connected to base 722 and can move in the longitudinal and latitudinal directions. Base 722 includes camera 728 for interactive playing. Other embodiments may hold portable devices at different angles with respect to stand 724 to improve display visibility by the player. In another embodiment, the pitch of portable device 726 is adjustable and changes according to the position of the player's eyes in order to place the display in the best position to face the player.

Figure 8:
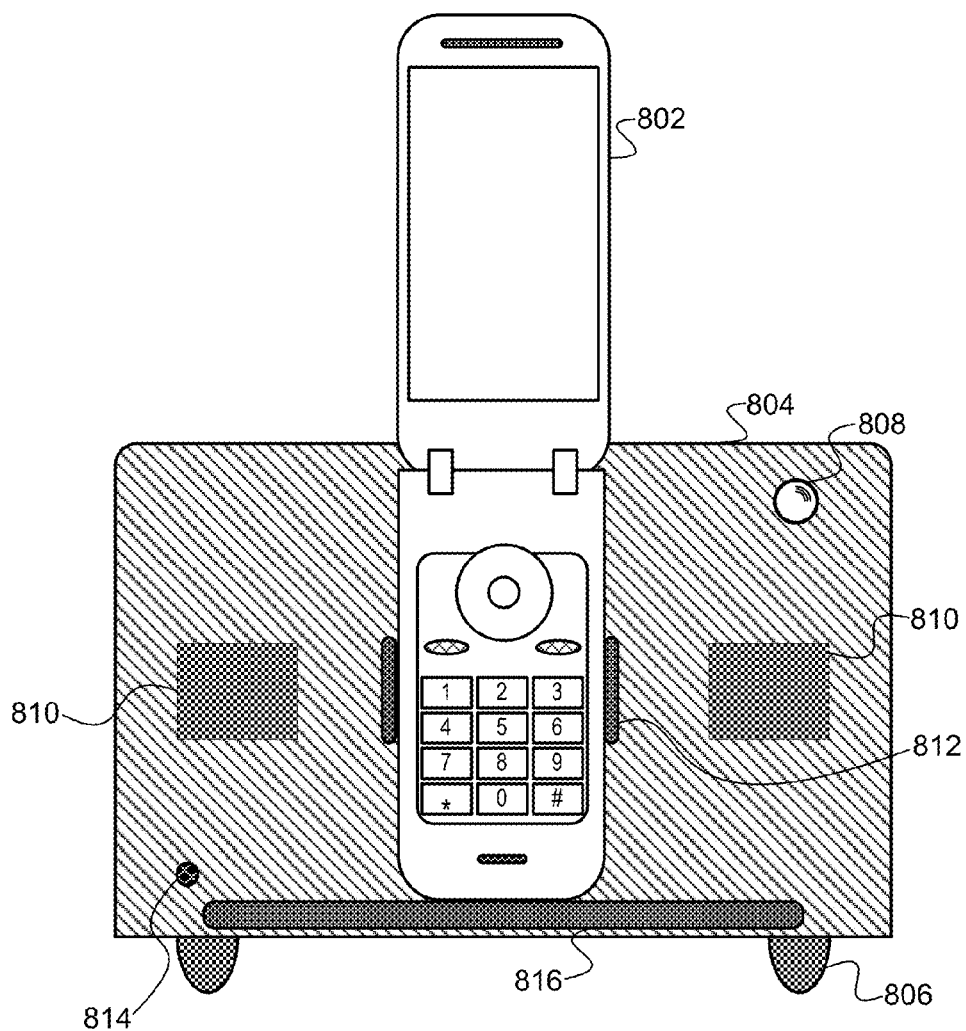
FIG. 8 depicts a stand holding a mobile phone for wireless interaction with an input device.

FIG. 8 depicts stand 804 holding mobile phone 802 for wireless interaction with an input device. Mobile phone 802 rests on platform 816 and is held firmly in place by side arms 812. Stand 804 includes camera on the top right corner to avoid being blocked by a mobile device that extends above the top of stand 804, such as mobile phone 802. Speakers 810 and microphone 814 provide audio output and input, respectively. Wheels 806 at bottom of stand 804 allow the stand to move along the surface in contact with the wheels. The wheels can rotate and move the stand in any direction. The wheels at the bottom can move independently from each other. This way, the stand can rotate to better face the player by moving the wheels on one side while not moving the wheels on the other side. In another embodiment, wheels 806 move only in one direction and allow the stand to move back and forth.

Figure 9:
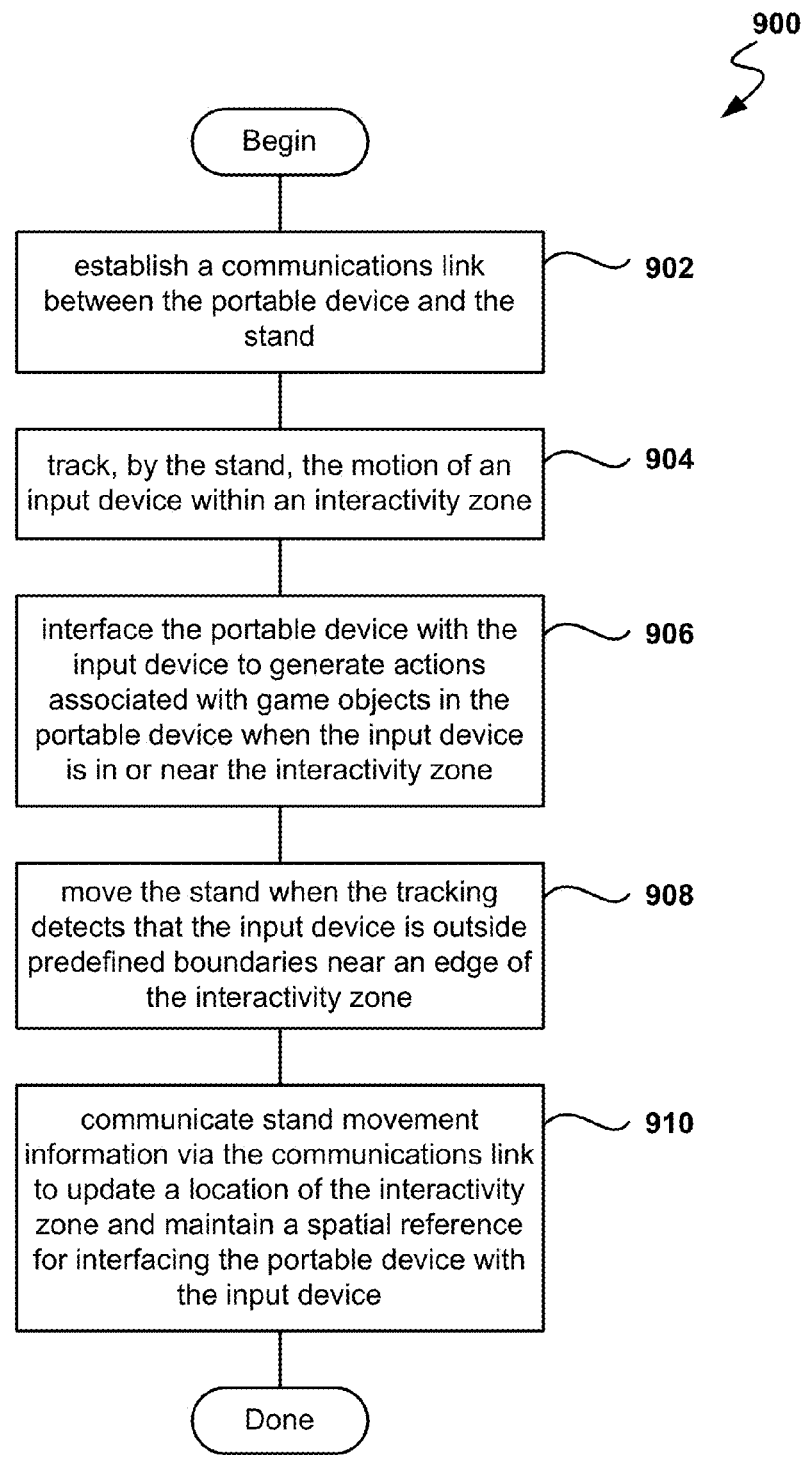
FIG. 9 shows the flow of an algorithm for wireless interaction with a portable device in accordance with one embodiment of the invention.

FIG. 9 shows the flow of an algorithm for wireless interaction with a portable device in accordance with one embodiment of the invention. In operation 902, the method establishes a communications link between the portable device and the stand. Further, in operation 904, the stand tracks the motion of an input device within an interactivity zone. See for example FIGS. 3A-3B depicting interaction with an input device within an interactivity zone. Additionally, in operation 906, the portable device interfaces with the input device to generate actions associated with game objects in the portable device when the input device is in or near the interactivity zone. The stand is moved in operation 908 when the tracking detects that the input device is outside predefined boundaries near an edge of the interactivity zone. In operation 910, the method communicates stand movement information via the communications link to update a location of the interactivity zone and maintain a spatial reference for interfacing the portable device with the input device.

Figure 10:
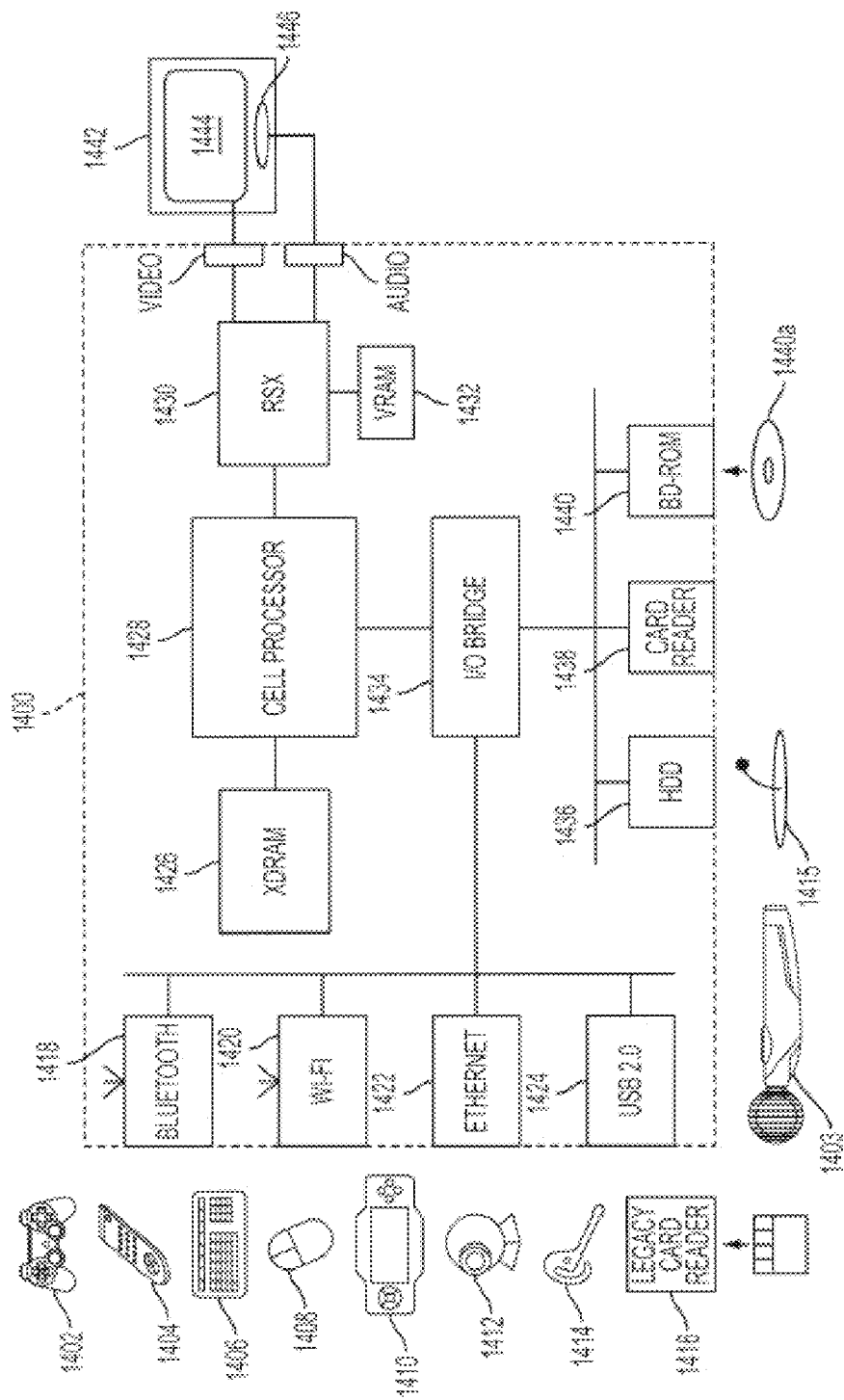
FIG. 10 illustrates hardware and user interfaces that may be used to interact wirelessly with a game device, in accordance with one embodiment of the invention.

FIG. 10 illustrates hardware and user interfaces that may be used for interacting wirelessly with a portable gaming device, in accordance with one embodiment of the invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415.

Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over Internet Protocol (IP) telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 11:
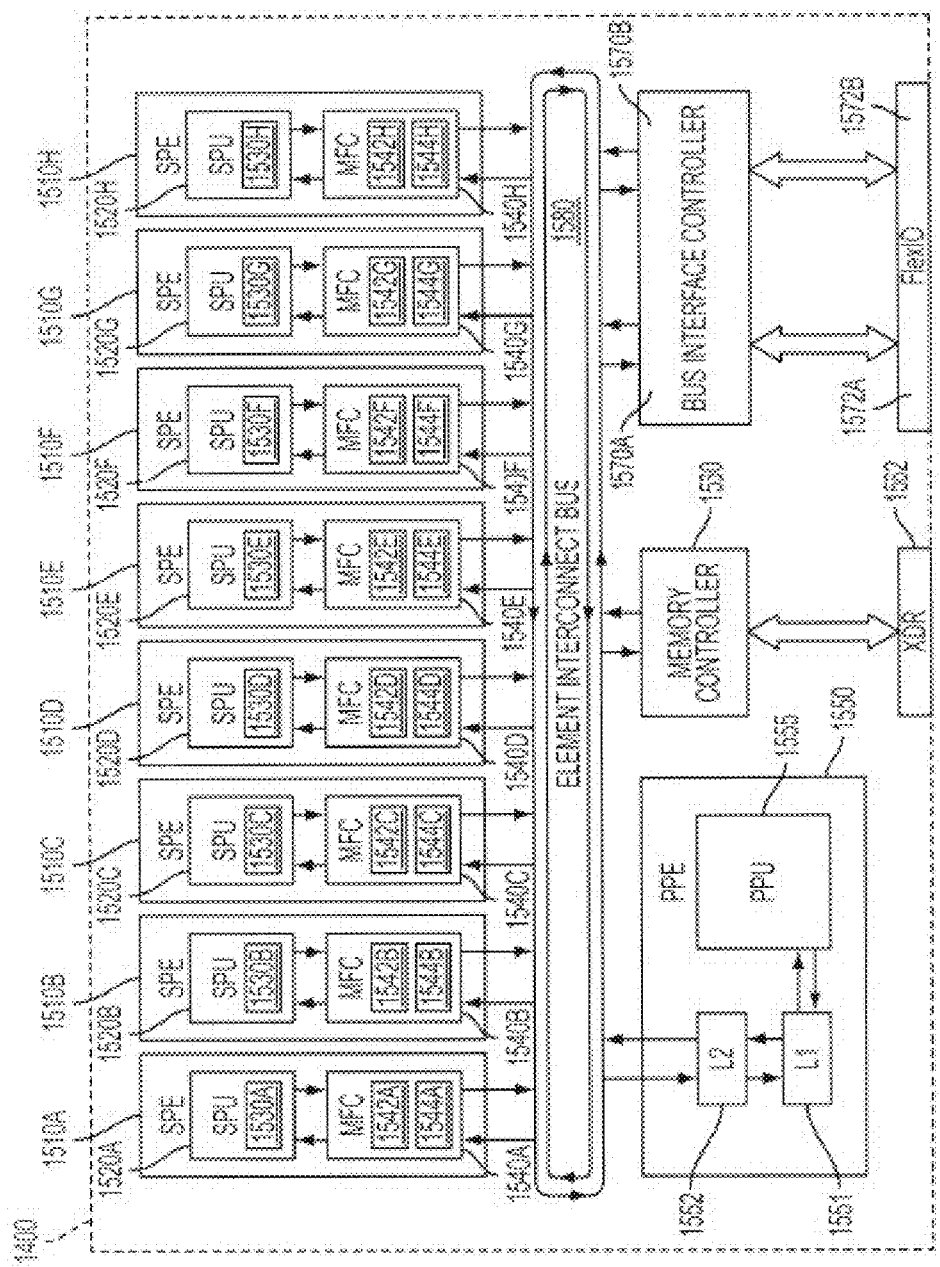
FIG. 11 illustrates additional hardware that may be used to process instructions, in accordance with one embodiment of the present invention.

FIG. 11 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RIIC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Figure 12:
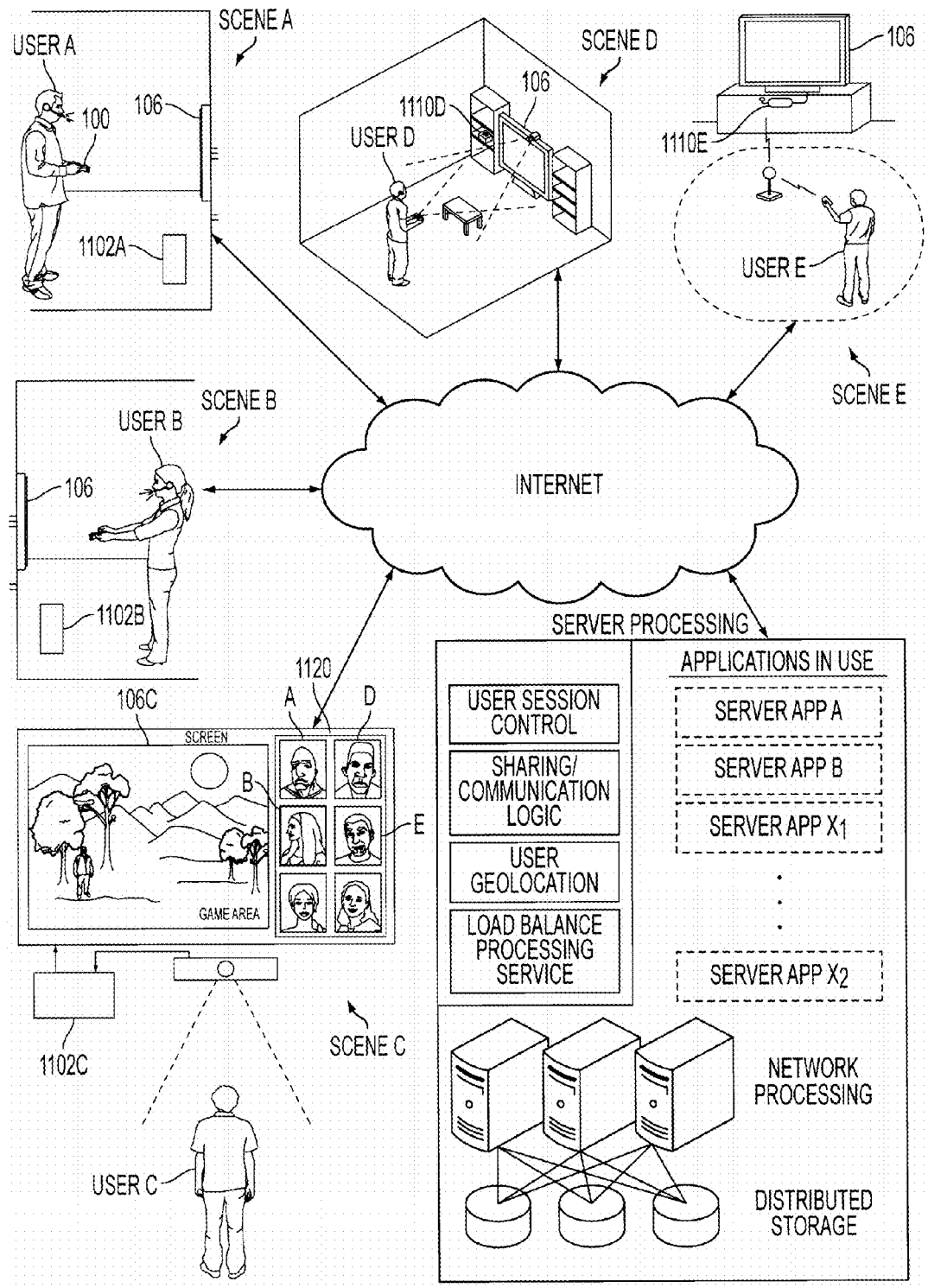
FIG. 12 is an exemplary illustration of scene A through scene E with respective user A through user E interacting with game clients 1102 that are connected to server processing via the internet, in accordance with one embodiment of the present invention.

FIG. 12 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 19, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 19 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 13:
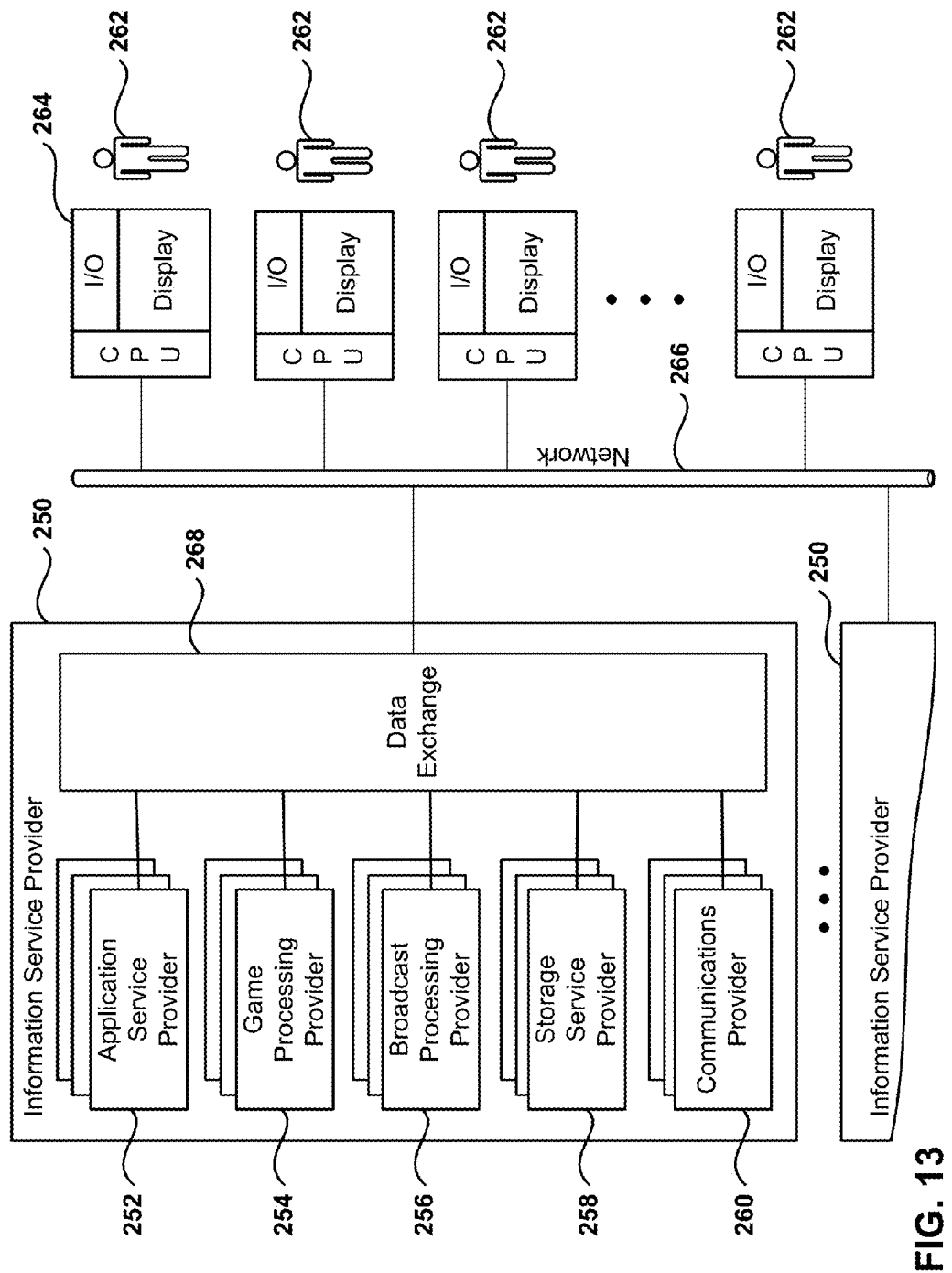
FIG. 13 illustrates an embodiment of an Information Service Provider architecture.

FIG. 13 illustrates an embodiment of an Information Service Provider architecture. Information Service Providers (ISP) 250 delivers a multitude of information services to users 262 geographically dispersed and connected via network 266. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 250 includes Application Service Provider (ASP) 252, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 250 includes a Game Processing Server (GPS) 254 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 256 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 258 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 260 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 268 interconnects the several modules inside ISP 253 and connects these modules to users 262 via network 266. Data Exchange 268 can cover a small area where all the modules of ISP 250 are in close proximity, or can cover a large geographic area when the different modules are geographically dispersed. For example, Data Exchange 268 can include a fast Gigabit Ethernet (or faster) within a cabinet of a data center, or an intercontinental virtual area network (VLAN).

Users 262 access the remote services with client device 264, which includes at least a CPU, a display and I/O. The client device can be a PC, a mobile phone, a netbook, a PDA, etc. In one embodiment, ISP 250 recognizes the type of device used by the client and adjusts the communication method employed. In other cases, client devices use a standard communications method, such as html, to access ISP 250.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for wireless interaction with a portable device, the method comprising:
    establishing a communications link between the portable device and a stand defined to support the portable device, wherein a location of the portable device determines an interactivity zone that is approximately in front of the portable device;
    establishing an interface between the portable device and a controller to receive inputs from a user via the controller to generate actions associated with game objects in a game to be executed by the portable device;
    tracking, by the stand, a spatial position of a controller;
    detecting by the stand that the controller is outside predefined boundaries near an edge of the interactivity zone;
    moving the stand, in response to the detecting, to move the portable device so that interactivity zone is repositioned approximately in front of the portable device; and
    communicating to the portable device via the communications link the moving of the stand.

2. The method as recited in claim 1, wherein the controller is a wireless controller, wherein interfacing the portable device with the controller further includes:
    capturing an image of the interactivity zone;
    receiving inertial movement information from the wireless controller; and
    analyzing the captured image and the inertial movement information to determine motion of the wireless controller.

3. The method as recited in claim 1, further including:
    sending a request, from the portable device to the stand, to move the stand.

4. The method as recited in claim 1, further including determining the interactivity zone, the determining comprising:
    identifying a current location of the controller;
    estimating a range of motion of the controller; and
    establishing the interactivity zone to cover at least the range of motion.

5. The method as recited in claim 4, further including:
    identifying additional controllers; and
    re-determining the interactivity zone to cover the controller and the additional controllers.

6. The method as recited in claim 1, further including:
    tracking static markers in the interactivity zone to identify motion of the portable device.

7. The method as recited in claim 1, wherein moving the stand further includes:
selection a motion to be performed by the stand, the motion selected from a group consisting of a movement in an x, y, or z direction, a yaw movement, a pitch movement, or a roll movement.

8. The method as recited in claim 1, further including:
providing video, audio or tactile feedback when the controller moves outside the interactivity zone.

9. The method as recited in claim 1, further including:
measuring a depth within the interactivity zone of the controller, wherein the generated actions associated with game objects are geared according to the depth.

10. The method as recited in claim 1, further including:
detecting a change in location of the stand, the change in location not being caused by the stand or the portable device; and
updating the location of the interactivity zone after detecting the change in location of the stand.

11. A stand for wireless interaction between a portable device and a controller, the stand defined for holding the portable device, the stand comprising:
a camera for capturing image data;
an input device detection module that tracks a location and movement of the controller based on the image data, the input device detection module being defined to determine an interactivity zone that is approximately in front of the portable device where motion of the controller is tracked, wherein the portable device is defined to establish an interface with the controller to receive inputs from a user via the controller to generate actions associated with game objects in a game to be executed by the portable device;
a stand motion module for moving the stand when the controller is outside predefined boundaries near an edge of the interactivity zone; and
a communications module for transferring stand movement information to the portable device.

12. The stand as recited in claim 11, wherein the communications module transmits the image data to remote devices during network game play.

13. The stand as recited in claim 11, wherein the input device detection module detects a player's face near the controller to determine the interactivity zone.

14. The stand as recited in claim 11, further including:
a depth camera to measure a distance between the depth camera and the controller.

15. The stand as recited in claim 11, wherein the portable device updates a location of the interactivity zone based on the stand movement information.

16. A computer program embedded in a non-transitory computer-readable storage medium, when executed by one or more processors, for wireless interaction with a portable device, the computer program comprising:
programs instructions for establishing a communications link between the portable device and a stand defined to support the portable device, wherein a location of the portable device determines an interactivity zone that is approximately in front of the portable device;
programs instructions for establishing an interface between the portable device and a controller to receive inputs from a user via the controller to generate actions associated with game objects in a game to be executed by the portable device;
programs instructions for tracking, by the stand, a spatial position of a controller;
programs instructions for detecting by the stand that the controller is outside predefined boundaries near an edge of the interactivity zone;
programs instructions for moving the stand, in response to the detecting, to move the portable device so that interactivity zone is repositioned approximately in front of the portable device; and
programs instructions for communicating to the portable device via the communications link the moving of the stand.

17. The computer program as recited in claim 16, further including:
program instructions for identifying a static mark in the interactivity zone; and
program instructions for identifying motion of the portable device when a location of the static mark changes.

18. The computer program as recited in claim 16, wherein the program instructions for tracking the motion of the controller further include:
program instructions for receiving inertial data from the controller regarding movement of the controller.

19. The computer program as recited in claim 16, wherein the portable device includes a display for showing 3D images viewable by a player wearing 3D glasses.

20. The computer program as recited in claim 16, further including:
program instructions for tracking the motion of additional controllers within the interactivity zone; and
program instructions for adjusting the interactivity zone when the controller or one of the additional controllers is outside the interactivity zone.

* * * * *